(12) United States Patent
Wang

(10) Patent No.: US 9,718,396 B2
(45) Date of Patent: Aug. 1, 2017

(54) ILLUMINATED RUNNING BOARD FOR VEHICLE

(71) Applicant: Desity Traffic Ind Co., Ltd., Tainan (TW)

(72) Inventor: Chun-Chieh Wang, Tainan (TW)

(73) Assignee: Desity Traffic Ind Co., Ltd., Tainan (TW)

( * ) Notice: Subject to any disclaimer, the term of this patent is extended or adjusted under 35 U.S.C. 154(b) by 168 days.

(21) Appl. No.: 14/526,567

(22) Filed: Oct. 29, 2014

(65) Prior Publication Data

US 2016/0121785 A1 May 5, 2016

(51) Int. Cl.
*B60Q 1/24* (2006.01)
*B60Q 1/32* (2006.01)
*F21V 8/00* (2006.01)

(52) U.S. Cl.
CPC ......... *B60Q 1/323* (2013.01); *G02B 6/0021* (2013.01); *G02B 6/0036* (2013.01); *G02B 6/0038* (2013.01)

(58) Field of Classification Search
CPC ..... B60Q 1/323; G02B 6/0021; G02B 6/0036
USPC ........................................................ 362/495
See application file for complete search history.

(56) References Cited

U.S. PATENT DOCUMENTS

| 1,439,210 | A | * | 12/1922 | Webster | B60Q 1/323 362/495 |
| 4,779,166 | A | * | 10/1988 | Tanaka | G02B 6/0021 362/307 |
| 2004/0076010 | A1 | * | 4/2004 | Kuo | G02B 6/0021 362/332 |
| 2005/0213351 | A1 | * | 9/2005 | Yang | B60Q 1/323 362/633 |
| 2007/0086179 | A1 | * | 4/2007 | Chen | G02B 6/0021 362/23.1 |
| 2008/0037266 | A1 | * | 2/2008 | Cunnien | B60Q 1/323 362/495 |

* cited by examiner

*Primary Examiner* — Sean Gramling
(74) *Attorney, Agent, or Firm* — Alan D. Kamrath; Kamrath IP Lawfirm, P.A.

(57) ABSTRACT

An illuminated running board for a vehicle includes a light guide plate, a panel, and a luminous module. A plurality of convex portions is formed on a top surface of the light guide plate, and a plurality of optic pattern portions is formed on a bottom surface of the light guide plate. A groove is formed in the bottom surface of the light guide plate and spaced from the optic pattern portions. The panel mounted on the top surface of the light guide plate has a plurality of through-holes, each of which is penetrated by one of the convex portions. The luminous module installed in the groove includes a plurality of luminous elements which are not opposite to the convex portions. Light rays from the luminous elements are conducted into the light guide plate, reflected to the optic pattern portions, and projected upward from the convex portions.

10 Claims, 5 Drawing Sheets

ILLUMINATED RUNNING BOARD FOR VEHICLE

BACKGROUND OF THE INVENTION

1. Field of the Invention

The present invention relates to a running board and, more particularly, to a luminous running board adapted to be installed on an automobile's lateral side.

2. Description of the Related Art

In general, a vehicle (e.g., a support utility vehicle, van, etc.) with a large height is laterally provided with running boards on which passengers tread to get on or off the vehicle. For improved security of passengers getting on or off a vehicle, light-emitting devices have been installed in running boards of some vehicles. When a vehicle is parked or a car door is opened, an illuminant (consisting of light emitting diodes) in the light-emitting device is activated and directly projects upward light rays on a top of the running board which can be treaded by a passenger. However, passengers or drivers in other running cars are dazzled by glare directly projected on running boards and feel uncomfortable. Furthermore, conventional raised luminous running boards on which upward light rays are projected are not easily observed by drivers in other running cars or even collided with accidentally when an automobile with the luminous running boards installed is parked.

BRIEF SUMMARY OF THE INVENTION

Thus, an objective of the present invention is to provide an illuminated running board for a vehicle which projects indirect light not dazzling passengers and other car drivers who will not see a light source directly. Furthermore, the illuminated running board also projects light rays sideward for safety in use.

To achieve this and other objectives, an illuminated running board for a vehicle of the present invention includes a transparent light guide plate, a panel, and a luminous module. The light guide plate includes a top surface, a bottom surface, and two lateral ends spaced in a longitudinal direction of the light guide plate. A plurality of convex portions is provided on the top surface of the light guide plate, and a groove is formed in the bottom surface of the light guide plate and extends in the longitudinal direction. The groove is not opposite to the plurality of convex portions in a thickness direction of the light guide plate. The panel is mounted on the top surface of the light guide plate and provided with a plurality of through-holes. Each convex portion of the light guide plate extends through one of the through-holes. The luminous module is mounted in the groove of the light guide plate and includes a plurality of luminous elements which are not opposite to the plurality of convex portions in the thickness direction of the light guide plate. Each of the luminous elements inside the light guide plate is controlled to project light rays which are radiated upward from the plurality of convex portions of the light guide plate.

In an embodiment, the light guide plate further includes a plurality of optic pattern portions formed on the bottom surface and spaced from the groove. The optic pattern portions are opposite to the convex portions in the thickness direction of the light guide plate. The luminous elements inside the light guide plate generate light rays which are reflected to the optic pattern portions and projected upward from the convex portions of the light guide plate.

In an embodiment, the illuminated running board further includes a reflector mounted on the bottom surface of the light guide plate to reflect light rays which are generated from the luminous elements inside the light guide plate and projected upward from the convex portions of the light guide plate and sideward from a periphery of the light guide plate.

In an embodiment, the convex portions include two spaced elongate convex portions each extending in the longitudinal direction. The optic pattern portions include two spaced elongate optic pattern portions opposite to the elongate convex portions in the thickness direction of the light guide plate. The groove is located between the two elongate optic pattern portions.

In an embodiment, the convex portions further include a plurality of spaced lump convex portions. The elongate convex portions are formed on a center of the top surface, and the lump convex portions are formed on the top surface adjacent to the lateral ends of the light guide plate. The optic pattern portions further includes a plurality of spaced lump optic pattern portions opposite to the lump convex portions in the thickness direction of the light guide plate. The plurality of optic pattern portions is formed by serrate or reticular microstructures.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
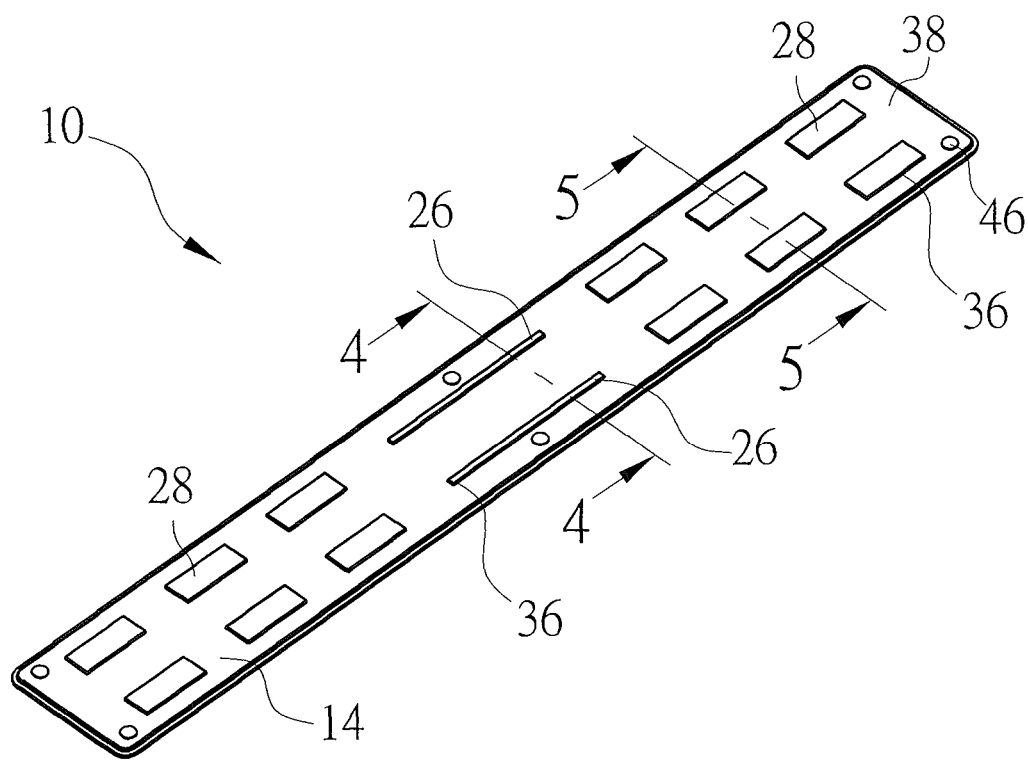
FIG. 1 is a perspective view of an illuminated running board for a vehicle according to an embodiment of the present invention.
Figure 2:
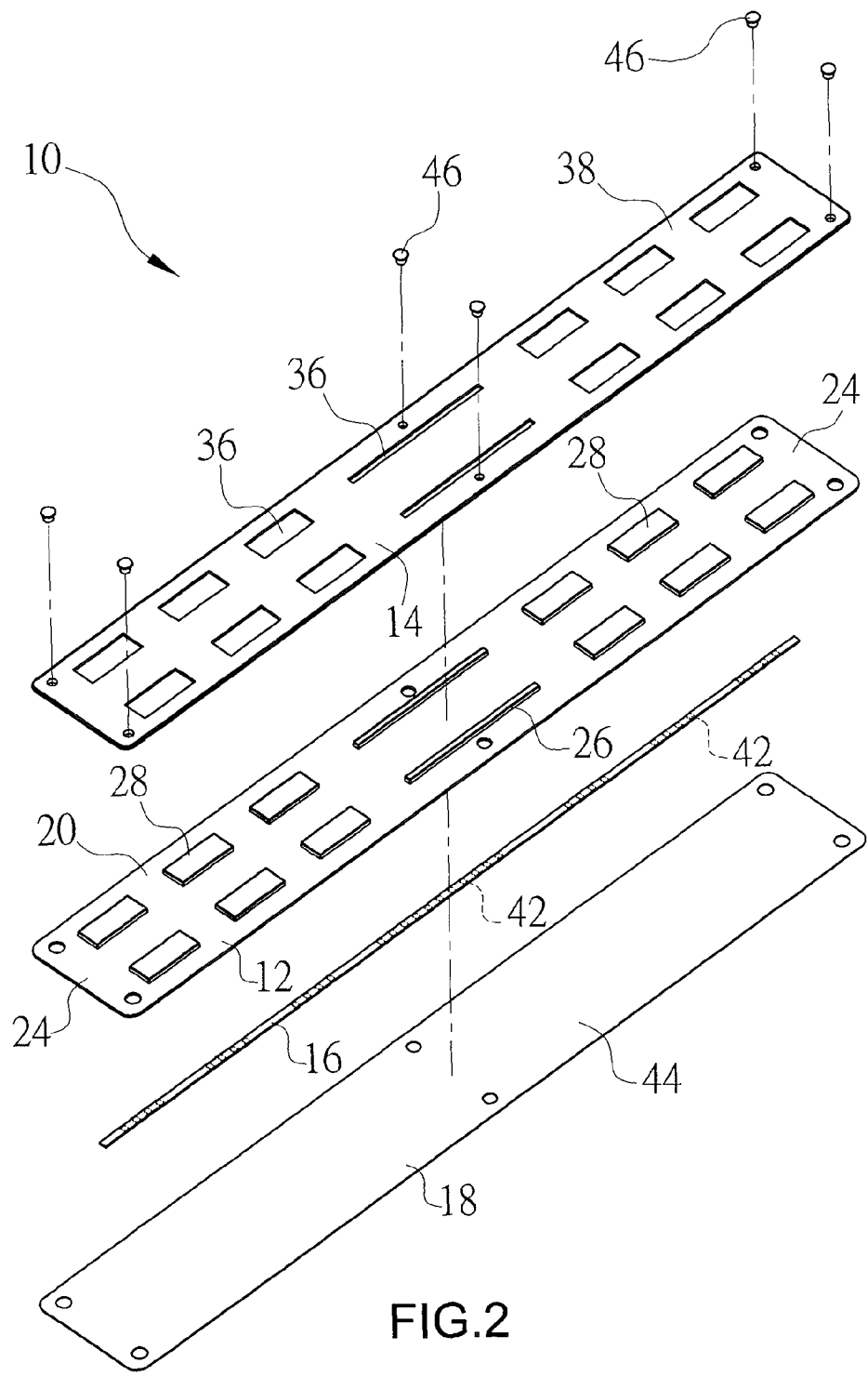
FIG. 2 is an exploded view of the illuminated running board of FIG. 1.
Figure 3:
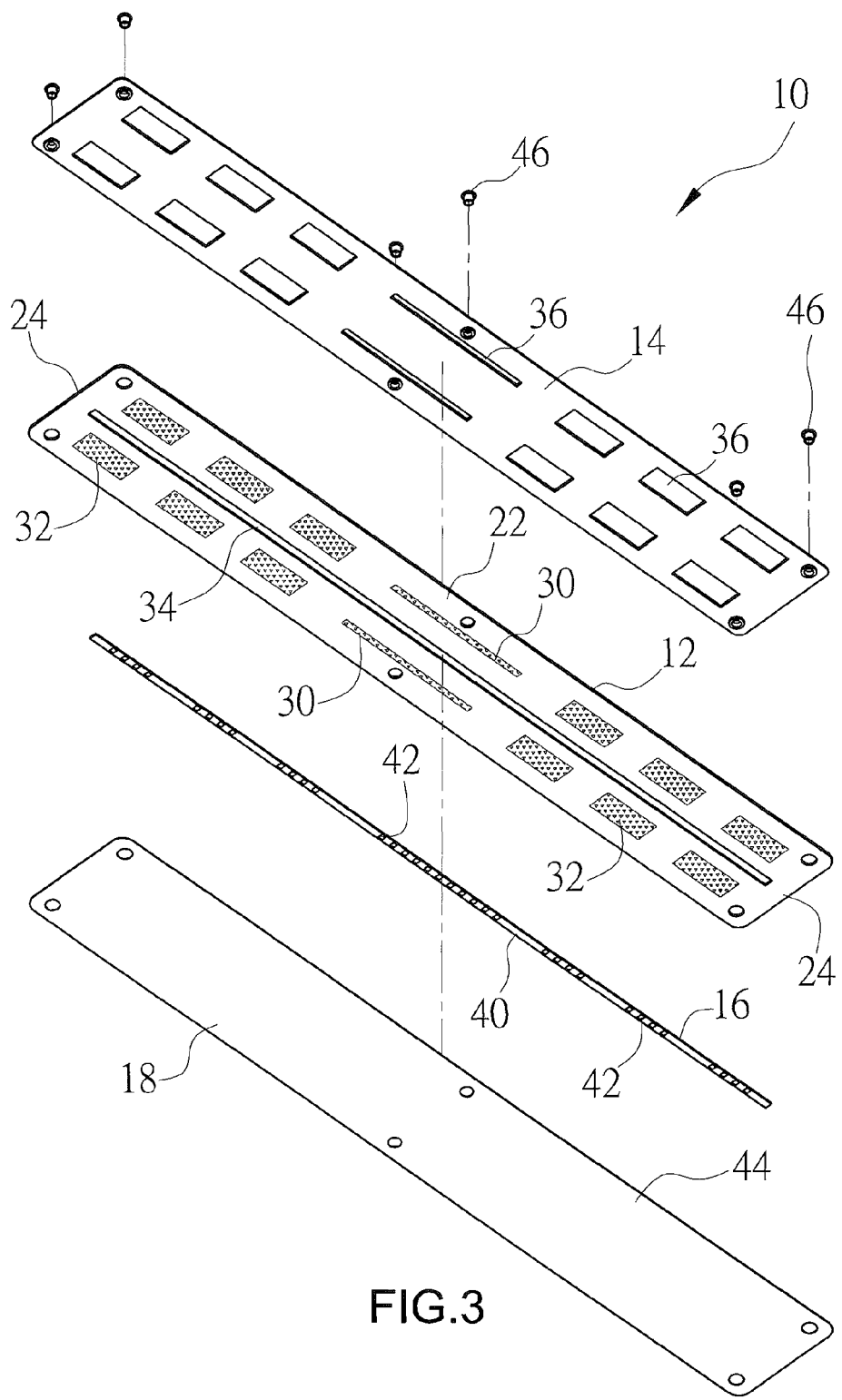
FIG. 3 is an alternative exploded view illustrating components of the illuminated running board of FIG. 1 from another direction.

An illuminated running board for a vehicle according to an embodiment of the present invention is shown in FIGS. 1 through 5 of the drawings and generally designated 10. The illuminated running board 10 is adapted to be installed on a vehicle's lateral side and includes a light guide plate 12, a panel 14, a luminous module 16, and a reflector 18.

The light guide plate 12 is made of transparent material like plastic and includes a top surface 20, a bottom surface 22, and two lateral ends 24 spaced in a longitudinal direction of the light guide plate 12. On the top surface 20 of the light guide plate 12 is provided a plurality of convex portions. In this embodiment, the convex portions include two spaced elongate convex portions 26 on a center of the top surface 20 and a plurality of spaced lump convex portions 28 on the top surface 20 adjacent to the lateral ends 24 of the light guide plate 12. In another practicable embodiment, each of the convex portions 26, 28 can be a pattern or text. On the bottom surface 22 of the light guide plate 12 is provided a plurality of optic pattern portions. In this embodiment, the optic pattern portions include two spaced elongate optic pattern portions 30 and a plurality of spaced lump optic pattern portions 32. The elongate optic pattern portions 30 are opposite to the elongate convex portions 26 in a thickness direction of the light guide plate 12 (FIG. 4), and the lump optic pattern portions 32 are opposite to the lump convex portions 28 in the thickness direction of the light guide plate 12 (FIG. 5). The optic pattern portions 30, 32 present serrate or reticular microstructures. Furthermore, a groove 34 is formed in the bottom surface 22 of the light guide plate 12 and extends in the longitudinal direction. The groove 34 is spaced from the optic pattern portions 30, 32 and is not opposite to the plurality of convex portions 26, 28 in the thickness direction of the light guide plate 12. In the embodiment, the groove 34 is located between the elongate optic pattern portions 30.

The panel 14 is made of opaque material like aluminum and engaged on the top surface 20 of the light guide plate 12. A plurality of through-holes 36 is provided in the panel 14 and corresponds to the convex portions 26, 28 of the light guide plate 12. Each of the convex portions 26, 28 penetrates a corresponding through-hole 36 of the panel 14 and protrudes from an upper surface 38 of the panel 14. In the embodiment, the upper surface 38 of the panel 14 forms a tread of the illuminated running board 10.

The luminous module 16 is mounted in the groove 34 of the light guide plate 12 and includes a light bar 40 extending in the longitudinal direction and a plurality of luminous elements 42 held in the light bar 40. In the embodiment, each of the luminous elements 42 consisting of light emitting diodes (LED) is electrically connected to a power supply such as automobile battery for controlled radiation from the luminous elements 42. The luminous elements 42 are spaced from the optic pattern portions 30, 32 because the luminous module 16 is held in the groove 34 of the light guide plate 12 and spaced from the optic pattern portions 30, 32. In the embodiment, at least one luminous element 42 is installed between the two optic pattern portions 30 and between two adjacent optic pattern portions 32. In a practicable embodiment, the luminous elements 42 can be installed in the groove 34 of the light guide plate 12 based on an alternative method.

In general, the reflector 18 mounted on the bottom surface 22 of the light guide plate 12 is equal to the light guide plate 12 in shape and size. The reflector 18 has an upper surface 44 taken as a reflective surface from which light rays are reflected. The reflector 18 which has been installed on the bottom surface 22 of the light guide plate 12 can be securely engaged with the light guide plate 12 and the panel 14 with fasteners 46 like screws, so that the luminous module 16 is steadily held in the groove 34 of the light guide plate 12. In a practicable embodiment, the reflector 18 can be substituted by a reflective layer (e.g., reflective sheeting) covered on the bottom surface 22 of the light guide plate 12.

Figure 4:
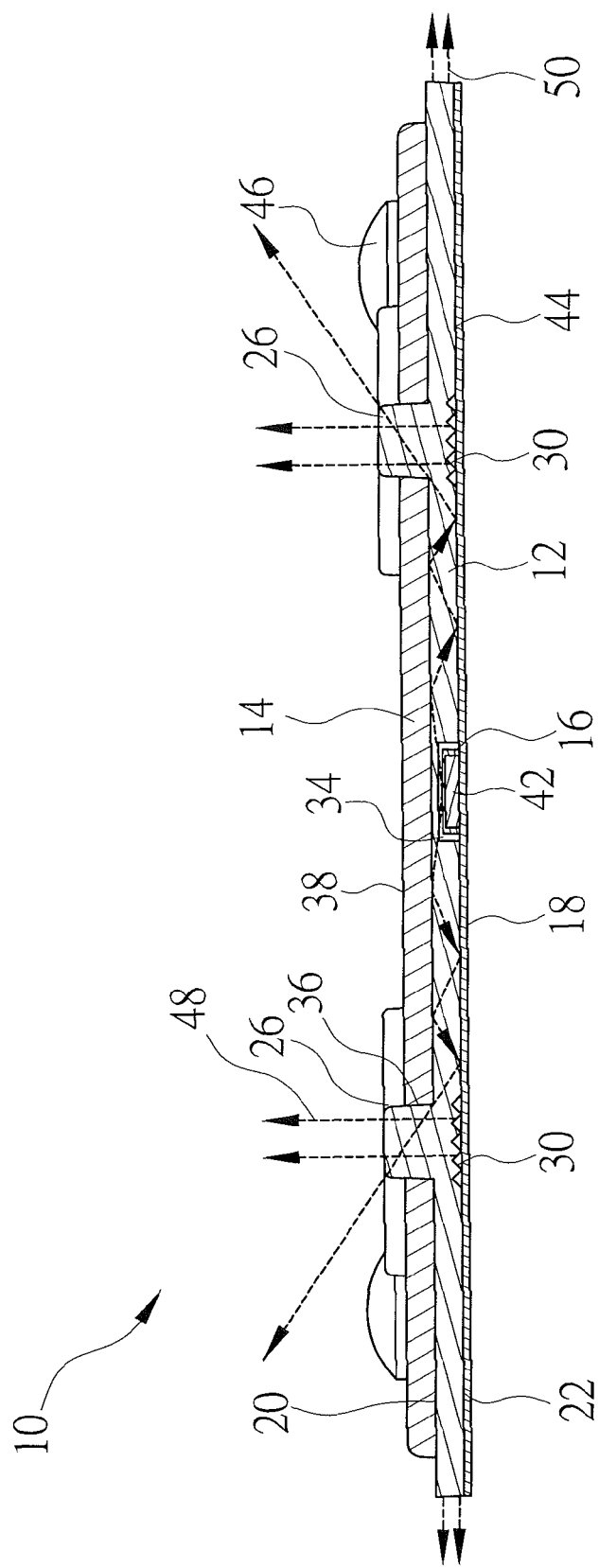
FIG. 4 is a sectional view taken along line 4-4 of FIG. 1.
Figure 5:
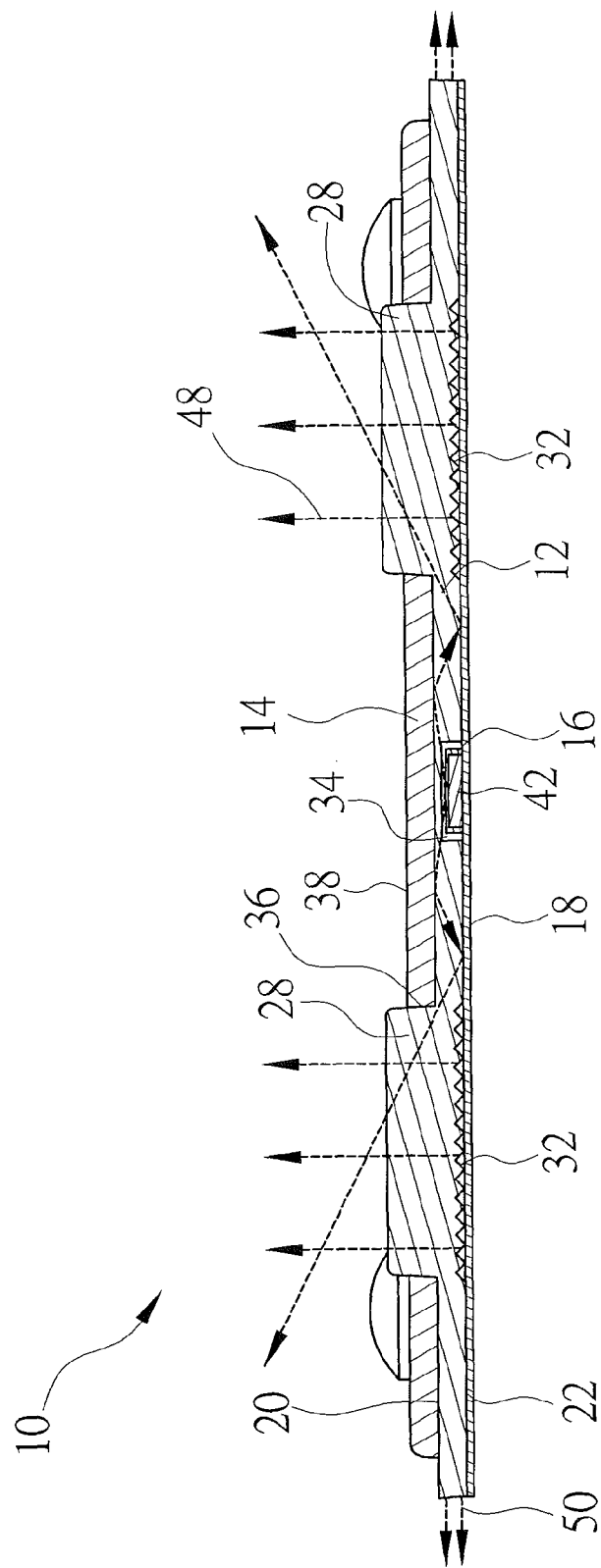
FIG. 5 is a sectional view taken along line 5-5 of FIG. 1.

As shown in FIGS. 4 and 5, light rays from the luminous elements 42 of the illuminated running board 10 of the present invention are conducted into the light guide plate 12, reflected to the optic pattern portions 30, 32 via the reflector 18, and projected upward from the convex portions 26, 28 of the light guide plate 12. The light rays 48 generated by the luminous elements 42 and projected upward through the panel 14 are neither direct light nor glare dazzling passengers or drivers driving other automobiles because the luminous elements 42 are not opposite to the convex portions 26, 28 of the light guide plate 12 in the thickness direction of the light guide plate 12. Furthermore, the light rays 48 reflected upward from the optic pattern portions 30, 32 present uniform illumination. Moreover, light rays generated from the luminous elements 42 inside the light guide plate 12 and reflected by the reflector 18 are projected around the periphery of the light guide plate 12 (which is pervious to light peripherally) for light rays 50 radiated sideward and toward the ground, so that the illuminated running board 10 can be clearly observed by passengers and other car drivers. As such, the illuminated running board 10 contributes to safety in use.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An illuminated running board for a vehicle, comprising:
   a transparent light guide plate including a top surface, a bottom surface, and two lateral ends spaced in a longitudinal direction of the light guide plate, with a plurality of convex portions provided on the top surface of the light guide plate, with the plurality of convex portions including first and second convex portions, with a groove formed in the bottom surface of the light guide plate and extending in the longitudinal direction, with each of the first and second convex portions having a portion length in the longitudinal direction and a portion width in a lateral direction, with the longitudinal direction being perpendicular to the lateral direction, with the portion length being elongated relative to the portion width, with the groove having a groove length in the longitudinal direction and a groove width in the lateral direction, with the groove length being elongated relative to the groove width, with the groove being not opposite to the plurality of convex portions in a thickness direction of the light guide plate, with the thickness direction being perpendicular to the longitudinal direction and to the lateral direction, with the groove being parallel to and spaced intermediate the first and second convex portions;
   a panel mounted on the top surface of the light guide plate and provided with a plurality of through-holes, with each of the plurality of convex portions of the light guide plate extending through one of the plurality of through-holes; and
   a luminous module mounted in the groove of the light guide plate and including a plurality of luminous elements which are not opposite to the plurality of convex portions in the thickness direction of the light guide plate, with each of the plurality of luminous elements inside the light guide plate controlled to project light rays which are radiated upward from the plurality of convex portions of the light guide plate, wherein the plurality of convex portions further includes third, fourth, fifth and sixth convex portions, with the first and second convex portions formed on a center of the top surface intermediate the two lateral ends, with the third, fourth, fifth and sixth convex portions formed on the top surface adjacent to the lateral ends of the light guide plate, with the third and fourth convex portions located on opposite sides of the groove than the fifth and sixth convex portions, with the third and fifth convex portions located on opposite sides of the first convex portion, with the fourth and sixth convex portions located on opposite sides of the second convex portion, with the illuminated running board further including a plurality of spaced optic pattern portions opposite to the plurality of convex portions in the thickness direction of the light guide plate, and with at least one of the plurality of luminous elements installed between each two spaced opposed optic pattern portions in the lateral direction.

2. The illuminated running board according to claim 1, further comprising:
a reflector mounted on the bottom surface of the light guide plate to reflect the light rays which are generated from the plurality of luminous elements inside the light guide plate and projected upward from the convex portions of the light guide plate and sideward from a periphery of the light guide plate.

3. The illuminated running board according to claim 1, wherein the groove length is larger than the portion length, wherein the luminous module has a module length in the longitudinal direction greater than the portion length.

4. The illuminated running board according to claim 3, wherein the light guide plate includes a plurality of optic pattern portions formed on the bottom surface and spaced from the groove, with the plurality of optic pattern portions being opposite to the plurality of convex portions in the thickness direction of the light guide plate, with the plurality of luminous elements inside the light guide plate generating light rays which are reflected to the plurality of optic pattern portions and projected upward from the plurality of convex portions of the light guide plate.

5. The illuminated running board according to claim 4, further comprising:
a reflector mounted on the bottom surface of the light guide plate to reflect the light rays which are generated from the plurality of luminous elements inside the light guide plate and projected upward from the convex portions of the light guide plate and sideward from a periphery of the light guide plate.

6. The illuminated running board according to claim 4, wherein the plurality of optic pattern portions is formed by serrate or reticular microstructures.

7. The illuminated running board according to claim 4, wherein each of the plurality of convex portions protrudes from an upper surface of the panel.

8. The illuminated running board according to claim 4, wherein the luminous module includes a light bar extending in the longitudinal direction, with the plurality of luminous elements held in the light bar.

9. An illuminated running board for a vehicle, comprising:
a transparent light guide plate including a top surface, a bottom surface, and two lateral ends spaced in a longitudinal direction of the light guide plate, with a plurality of convex portions provided on the top surface of the light guide plate, with the plurality of convex portions including first and second convex portions, with a groove formed in the bottom surface of the light guide plate and extending in the longitudinal direction, with each of the first and second convex portions having a portion length in the longitudinal direction and a portion width in a lateral direction, with the longitudinal direction being perpendicular to the lateral direction, with the portion length being elongated relative to the portion width, with the groove having a groove length in the longitudinal direction and a groove width in the lateral direction, with the groove length being elongated relative to the groove width, with the groove being not opposite to the plurality of convex portions in a thickness direction of the light guide plate, with the thickness direction being perpendicular to the longitudinal direction and to the lateral direction, with the groove being parallel to and spaced intermediate the first and second convex portions;
a panel mounted on the top surface of the light guide plate and provided with a plurality of through-holes, with each of the plurality of convex portions of the light guide plate extending through one of the plurality of through-holes; and
a luminous module mounted in the groove of the light guide plate and including a plurality of luminous elements which are not opposite to the plurality of convex portions in the thickness direction of the light guide plate, with each of the plurality of luminous elements inside the light guide plate controlled to project light rays which are radiated upward from the plurality of convex portions of the light guide plate, wherein the groove length is larger than the portion length, wherein the luminous module has a module length in the longitudinal direction greater than the portion length, wherein the light guide plate includes a plurality of optic pattern portions formed on the bottom surface and spaced from the groove, with the plurality of optic pattern portions being opposite to the plurality of convex portions in the thickness direction of the light guide plate, with the plurality of luminous elements inside the light guide plate generating light rays which are reflected to the plurality of optic pattern portions and projected upward from the plurality of convex portions of the light guide plate, wherein the plurality of convex portions further includes third, fourth, fifth and sixth convex portions, with the first and second convex portions formed on a center of the top surface intermediate the two lateral ends, with the third, fourth, fifth and sixth convex portions formed on the top surface adjacent to the lateral ends of the light guide plate, with the third and fourth convex portions located on opposite sides of the groove than the fifth and sixth convex portions, with the third and fifth convex portions located on opposite sides of the first convex portion, with the fourth and sixth convex portions located on opposite sides of the second convex portion, with at least one of the plurality of luminous elements installed between each of the first and second convex portions, the third and fourth convex portions and the fifth and sixth convex portions in the lateral direction.

10. An illuminated running board for a vehicle, comprising:
a transparent light guide plate including a top surface, a bottom surface, and two lateral ends spaced in a longitudinal direction of the light guide plate, with a plurality of convex portions provided on the top surface of the light guide plate, with the plurality of convex portions including first and second convex portions spaced in a lateral direction, with the longitudinal direction being perpendicular to the lateral direction, with a groove formed in the bottom surface of the light guide plate and extending in the longitudinal direction, with the groove being not opposite to the plurality of convex portions in a thickness direction of the light guide plate, with the thickness direction being perpendicular to the longitudinal direction and to the longitudinal direction, with the groove being parallel to and spaced intermediate the first and second convex portions in the lateral direction;
a panel mounted on the top surface of the light guide plate and provided with a plurality of through-holes, with each of the plurality of convex portions of the light guide plate extending through one of the plurality of through-holes; and a luminous module mounted in the groove of the light guide plate and including a plurality of luminous elements which are not opposite to the plurality of convex portions in the thickness direction of the light guide plate, with at least one of the plurality of luminous elements installed between the first and second convex portions in the lateral direction, with each of the plurality of luminous elements inside the light guide plate controlled to project light rays which are radiated upward from the plurality of convex portions of the light guide plate, wherein the plurality of convex portions further includes third, fourth, fifth and sixth convex portions, with the first and second convex portions formed on a center of the top surface intermediate the two lateral ends, with the third, fourth, fifth and sixth convex portions formed on the top surface adjacent to the lateral ends of the light guide plate, with the third and fourth convex portions located on opposite sides of the groove, with the fifth and sixth convex portions located on opposite sides of the groove, with the third and fifth convex portions located on opposite sides of the first convex portion in the longitudinal direction, with the fourth and sixth convex portions located on opposite sides of the second convex portion in the longitudinal direction, with at least one of the plurality of luminous elements installed between the third and fourth convex portions in the lateral direction, with at least one of the plurality of luminous elements installed between the fifth and sixth convex portions in the lateral direction, with a plurality of optic pattern portions formed on the bottom surface of the light guide plate and being opposite to the plurality of convex portions in the thickness direction, with the plurality of luminous elements inside the light guide plate generating light rays which are reflected to the plurality of optic pattern portions and projected upward from the plurality of convex portions of the light guide plate.

* * * * *